US011034113B2

(12) United States Patent
Jones et al.

(10) Patent No.: US 11,034,113 B2
(45) Date of Patent: Jun. 15, 2021

(54) METHOD OF ASSEMBLING A COMPOSITE SPAR REMOVABLE MANDREL

(71) Applicant: Sikorsky Aircraft Corporation, Stratford, CT (US)

(72) Inventors: Corey D. Jones, Prospect, CT (US); Frank Caputo, Cheshire, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 16/774,105

(22) Filed: Jan. 28, 2020

(65) Prior Publication Data
US 2020/0156342 A1 May 21, 2020

Related U.S. Application Data

(62) Division of application No. 15/114,601, filed as application No. PCT/US2014/013537 on Jan. 29, 2014, now abandoned.

(51) Int. Cl.
*B29D 99/00* (2010.01)
*B64C 27/473* (2006.01)
(Continued)

(52) U.S. Cl.
CPC .......... *B29D 99/0028* (2013.01); *B29C 53/82* (2013.01); *B29C 53/821* (2013.01);
(Continued)

(58) Field of Classification Search
CPC ... B29C 33/485; B29C 45/4421; B29C 53/42; B29C 53/82; B29C 53/821;
(Continued)

(56) References Cited

U.S. PATENT DOCUMENTS 1,676,325 A 7/1928 Doll
2,830,552 A * 4/1958 Ballauer .................. B23K 3/08
269/47
(Continued)

FOREIGN PATENT DOCUMENTS

WO 1996009159 A1 3/1996
WO 2012042261 A1 4/2012

OTHER PUBLICATIONS

"MAG Introduces New Viper Gantry Fiber Placement System for Supersize Wind Energy and Aerospace Parts—First Unit Acquired by Astraeus Wind Energy", retrieved from http://www.mag-ias.com/en/mag-news/press-archive/archive/archive2/press-archive/2012; 2pg.
(Continued)

*Primary Examiner* — Mark A Osele
*Assistant Examiner* — Brian R Slawski
(74) *Attorney, Agent, or Firm* — Foley & Lardner LLP

(57) ABSTRACT

A method of constructing a mandrel generally complementary to a spar cavity of a spar includes connecting a first component and a second component to form a central space there between and inserting a center component within the central space such that the center component retains the first component and second component in a desired position forming an outer surface of the mandrel which corresponds to an inner surface of the spar cavity.

15 Claims, 8 Drawing Sheets

(51) Int. Cl.

| | |
|---|---|
| *B29C 70/32* | (2006.01) |
| *B29C 53/82* | (2006.01) |
| *B29L 31/08* | (2006.01) |
| *B29C 53/42* | (2006.01) |
| *B29C 33/48* | (2006.01) |
| *B29C 70/44* | (2006.01) |
| *B29C 70/34* | (2006.01) |
| *B29C 45/44* | (2006.01) |
| *B29C 65/56* | (2006.01) |
| *B29C 65/76* | (2006.01) |
| *B32B 1/08* | (2006.01) |
| *B32B 37/10* | (2006.01) |

(52) U.S. Cl.
CPC .......... *B29C 70/32* (2013.01); *B29D 99/0025* (2013.01); *B64C 27/473* (2013.01); *B29C 33/485* (2013.01); *B29C 45/4421* (2013.01); *B29C 53/42* (2013.01); *B29C 53/824* (2013.01); *B29C 65/56* (2013.01); *B29C 65/76* (2013.01); *B29C 70/342* (2013.01); *B29C 70/446* (2013.01); *B29L 2031/082* (2013.01); *B32B 1/08* (2013.01); *B32B 2037/1081* (2013.01); *B64C 2027/4736* (2013.01)

(58) Field of Classification Search
CPC ....... B29C 53/824; B29C 65/00; B29C 65/56; B29C 65/565; B29C 65/72; B29C 65/76; B29C 70/30; B29C 70/342; B29C 70/44; B29C 70/446; B29C 70/32; B29D 99/0025; B29D 99/0028; B29L 2031/082; B29L 2031/085; B64C 27/473; B64C 2027/4736; B64C 27/46; B32B 1/08; B32B 37/1018; B32B 2037/1081; B33Y 80/00; B64F 5/10
USPC ..... 156/60, 91, 92, 152, 184, 189, 190, 191, 156/192, 242, 245, 285, 286, 289, 293, 156/294, 304.1, 304.5, 307.1, 307.7; 249/142, 144, 160, 163, 175, 178, 184; 29/889.6, 889.7, 889.71, 889.72, 889.721; 425/392, 393, 403
See application file for complete search history.

(56) References Cited

U.S. PATENT DOCUMENTS

| | | | |
|---|---|---|---|
| 3,582,036 A | 6/1971 | Condis | |
| 3,897,931 A | 8/1975 | Hake | |
| 4,286,766 A | 9/1981 | Von Holdt | |
| 4,310,138 A * | 1/1982 | Johnston | B29C 33/485 249/178 |
| 4,389,180 A | 6/1983 | Gordon | |
| 4,525,228 A | 6/1985 | Bowen | |
| 4,650,534 A * | 3/1987 | Mussi | B64C 27/473 156/245 |
| 4,781,799 A * | 11/1988 | Herbert, Jr. | C25D 1/02 205/73 |
| 5,430,937 A * | 7/1995 | Leahy | B29C 70/446 29/889.6 |
| 8,163,219 B2 | 4/2012 | Callis et al. | |
| 8,510,946 B2 | 8/2013 | Callis et al. | |
| 2003/0124287 A1 | 7/2003 | Grosskrueger et al. | |
| 2008/0157429 A1 | 7/2008 | Callis et al. | |
| 2009/0189325 A1* | 7/2009 | Callis | B29C 33/485 269/50 |
| 2010/0230850 A1* | 9/2010 | Sanderson | B33Y 70/00 264/164 |
| 2012/0056358 A1* | 3/2012 | Dixon | B29C 70/547 264/572 |
| 2012/0255669 A1* | 10/2012 | Catsman | B29C 70/443 156/189 |
| 2013/0112309 A1* | 5/2013 | Stewart | B29C 53/585 138/140 |
| 2013/0181374 A1* | 7/2013 | Ender | B29C 33/485 264/258 |
| 2016/0339661 A1 | 11/2016 | Jones et al. | |

OTHER PUBLICATIONS

Benchoff, Brian, "3D Printed Helicopter Blades", Hackaday.com, Jan. 23, 2012; 17 pgs.

International Preliminary Report on Patentability; International Application No. PCT/US2014/013537; International Filing Date: Jan. 29, 2014; dated Aug. 2, 2016; 7 Pages.

International Search Report and Written Opinion for Application No. PCT/US2014/013537 dated May 15, 2014; 2 pgs.

* cited by examiner

METHOD OF ASSEMBLING A COMPOSITE SPAR REMOVABLE MANDREL

CROSS REFERENCE TO RELATED APPLICATIONS

The present invention claims priority to PCT Application No. PCT/US14/013537, filed Jan. 29, 2014, and U.S. application Ser. No. 15/114,601, filed Jul. 27, 2016, the contents of which are incorporated herein by reference in their entirety.

BACKGROUND

Exemplary embodiments of the invention generally relate to a hollow composite member for a rotary wing aircraft, and more particularly, to the process and apparatus used to manufacture of the composite rotor blades of a rotary wing aircraft.

Rotor blades are a critical component of every helicopter. The rotor blades are subjected to a complex set of rather extreme aerodynamic forces that vary continually during flight. The rotor blades function as rotating airfoils or wings that are shaped to provide the aerodynamic lift required for a given aircraft. Rotor blades typically include a spar that extends from the root of the rotor blade to its tip. The spar is a major structural element of the rotor blade that provides the blade with the structural strength needed to carry high operational loads.

The typical rotor blade spar is a long tubular structure around which the rest of the blade is formed. The spar tube has an elliptical cross-section that is formed to provide a forward or leading edge and rearward or trailing edge. In order to provide optimum aerodynamic performance, many spar tubes include a slight twist about the longitudinal axis. Typical twists in the spar provide rotations of the elliptical cross-section of up to 10 degrees and more from the root of the rotor blade to its tip. In addition, the elliptical shape of the spar cross-section may be varied from the spar root to the spar tip to meet a variety of aerodynamic and structural loading parameters.

High strength materials, such as titanium and aluminum alloys, have typically been used to make rotor blades. These high strength metal materials are particularly well suited for forming the rotor blade spar. Titanium has been routinely formed into the relatively long, tubular spar structure and machined or otherwise fabricated to provide a complex variety of twists and varying cross-sectional shapes.

Composite materials have also been used to form rotor blade spars. Their combination of light weight and structural strength has made composites a popular choice for making not only the rotor blade spar, but the entire rotor blade.

The typical composite spar is fabricated by applying the uncured composite material to the surface of a long cylindrical mold or mandrel that is shaped to provide the interior surface of the spar tube. After the composite material is applied to the mandrel, it is compacted and cured at an elevated temperature to provide the final spar structure. A problem associated with making composite spars revolves around what to do with the mandrel once the spar has been formed. The length of the mold and the variations in elliptical cross-section of the spar, as well as any twist in the spar, make it very difficult to remove the mandrel after the spar has cured.

Typical methods for fabricating a mandrel use standard tooling materials, such as steel or aluminum, which are able to be reused but increase the cost of the mandrel. Some advanced tool designs include composite mandrels to help combat any thermal co-efficient of expansion (CTE) incompatibilities. Mandrel material selection is an important part of making successful composite spars.

BRIEF DESCRIPTION

According to an embodiment, a method of constructing a mandrel generally complementary to a spar cavity of a spar includes connecting a first component and a second component to form a central space there between and inserting a center component within the central space such that the center component retains the first component and second component in a desired position forming an outer surface of the mandrel which corresponds to an inner surface of the spar cavity.

In addition to one or more of the features described above, or as an alternative, in further embodiments the connecting the first component and second component comprises magnetically coupling the first and second components.

In addition to one or more of the features described above, or as an alternative, in further embodiments connecting the first component and second component comprises interlocking the first and second components using complementary keyway grooves.

In addition to one or more of the features described above, or as an alternative, in further embodiments inserting the center component further comprises interlocking a portion of the center component with the first and second components.

In addition to one or more of the features described above, or as an alternative, in further embodiments connecting the first and second components and inserting the central component forms a first segment of the mandrel, the method further comprising forming a second segment by connecting a third component and a fourth component to form another central space there between, inserting another center component within the another central space such that the another center component retains the third component and fourth component in a desired position forming another outer surface of the mandrel which corresponds to another inner surface of the spar cavity and connecting the formed first segment and second segment of the mandrel.

In addition to one or more of the features described above, or as an alternative, in further embodiments further comprising forming at least one of the first component, second component, and center component using a plastic material via an additive manufacturing method.

In addition to one or more of the features described above, or as an alternative, in further embodiments further comprising applying a layer of shrink wrap about the outer surface of the mandrel.

In addition to one or more of the features described above, or as an alternative, in further embodiments further comprising applying a bagging material about the shrink wrap, the bagging material being configured to apply a pressure to the inner surface of the spar cavity.

In addition to one or more of the features described above, or as an alternative, in further embodiments further comprising constructing a spar about the mandrel, wherein constructing the spar further comprises: layering multiple plies of material about at least a portion of an exterior of the mandrel, installing the mandrel in a final curing mold, applying a pressure to at least one of the interior first surface and the interior second surface of the spar, removing the mandrel from a center of layered plies by individually removing the first, second, and center components, and curing the layers of plies.

In addition to one or more of the features described above, or as an alternative, in further embodiments removing the mandrel includes the steps of removing the center component of the mandrel and removing each of the first component and second component individually.

In addition to one or more of the features described above, or as an alternative, in further embodiments the layered plies have varying fiber orientations relative to the mandrel.

In addition to one or more of the features described above, or as an alternative, in further embodiments the layered plies are cured using a vacuum.

The detailed description explains embodiments of the invention, together with advantages and features, by way of example with reference to the drawings.

A detailed description of one or more embodiments of the disclosed apparatus and method are presented herein by way of exemplification and not limitation with reference to the Figures.

DETAILED DESCRIPTION

A detailed description of one or more embodiments of the disclosed apparatus and method are presented herein by way of exemplification and not limitation with reference to the Figures.

Figure 1:
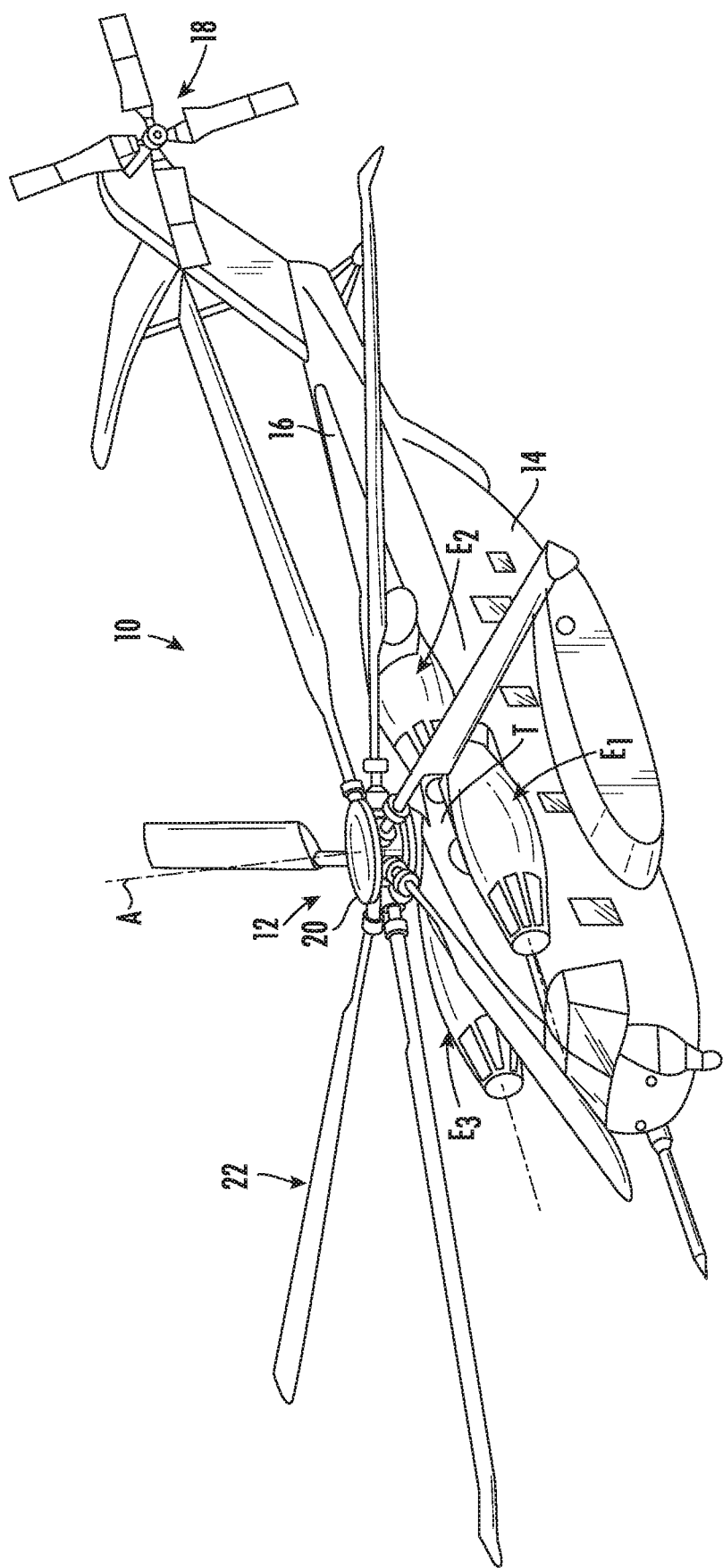
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18 as an anti-torque system. The main rotor assembly 12 is driven about an axis of rotation A through a main gearbox (illustrated schematically at T) by one or more engines E. The main rotor system 12 includes a rotor hub 20 having a plurality of rotor blade assemblies 22 mounted to and projecting radially outwardly therefrom. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
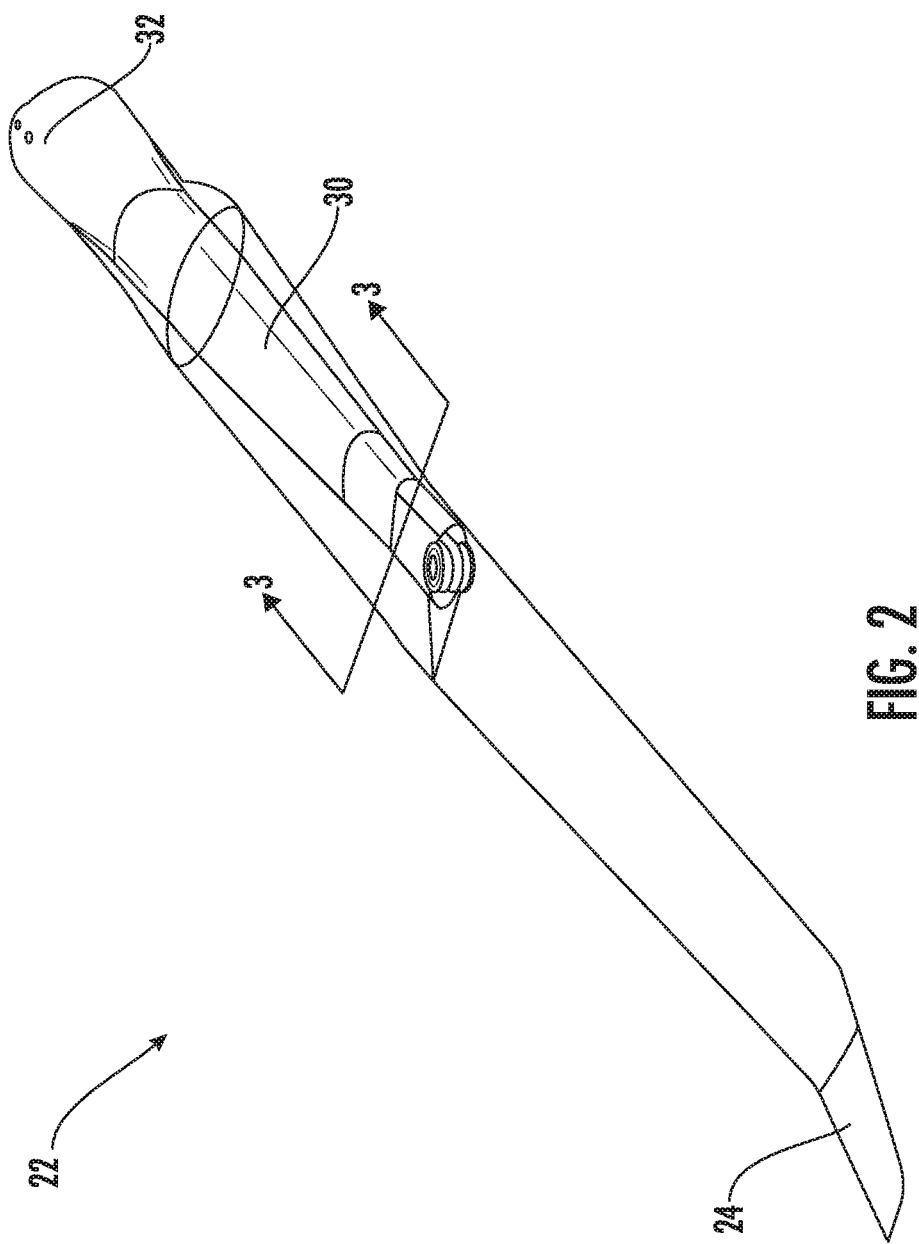
FIG. 2 is a perspective view of a rotor blade assembly of a rotor system of the rotary wing aircraft of FIG. 1.
Figure 3:
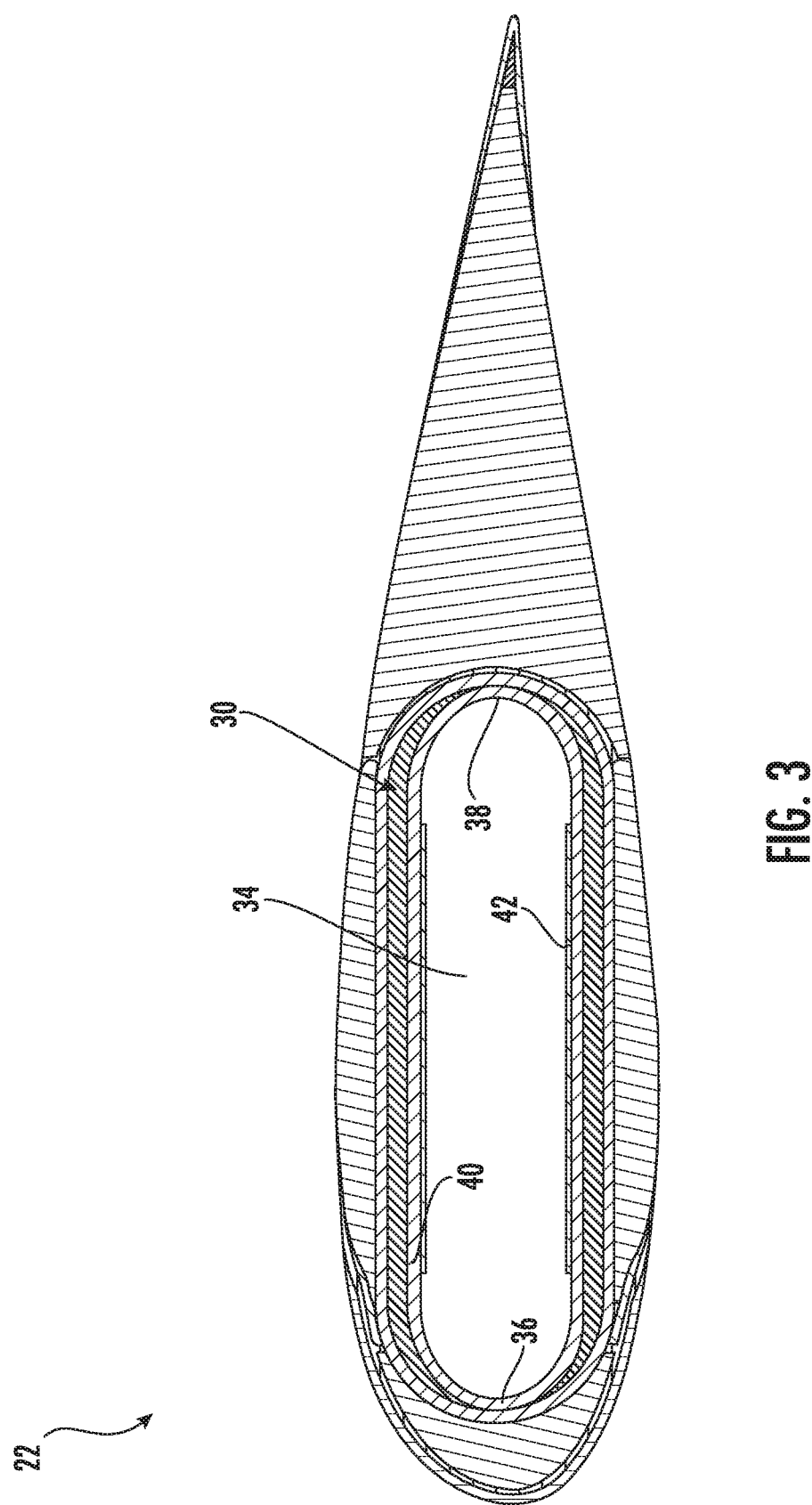
FIG. 3 is a cross-sectional view of the rotor blade assembly of FIG. 2 taken A-A.

Referring now to the exemplary rotor blade assembly 22 illustrated in FIGS. 2 and 3, a generally hollow, tubular spar 30 configured to couple to the rotor hub 20 at an inboard end 32 extends over at least a portion of the length of the rotor blade assembly 22. In one embodiment, the spar 30 may extend to the blade tip 24 of the rotor blade assembly 22. The cross-section of the spar 30 may vary in size and shape over the length of the spar 30 depending on the contour of the rotor blade assembly 22. Such changes can include reduced cross sectional area, twists as a function of length, and/or turns to accommodate a swept portion of a blade. The spar 30, as shown in FIG. 3, includes a plurality of interior surfaces that define an interior spar cavity 34. The interior surfaces include an interior leading edge surface 36, an interior trailing edge surface 38, an interior upper surface 40, and an interior lower surface 42. Both the interior upper and lower surfaces 40, 42 extend opposite one another between the interior leading and trailing edge surfaces 36, 38. The spar 30 is a structural member having a high torsional and axial stiffness and strength and, therefore, may be made from a high strength material, including but not limited to metal, graphite, fiberglass or some combination thereof. While shown with tip 24 having swept geometry, it is understood that the tip 24 need not have a swept geometry in all embodiments of the invention.

Figure 4:
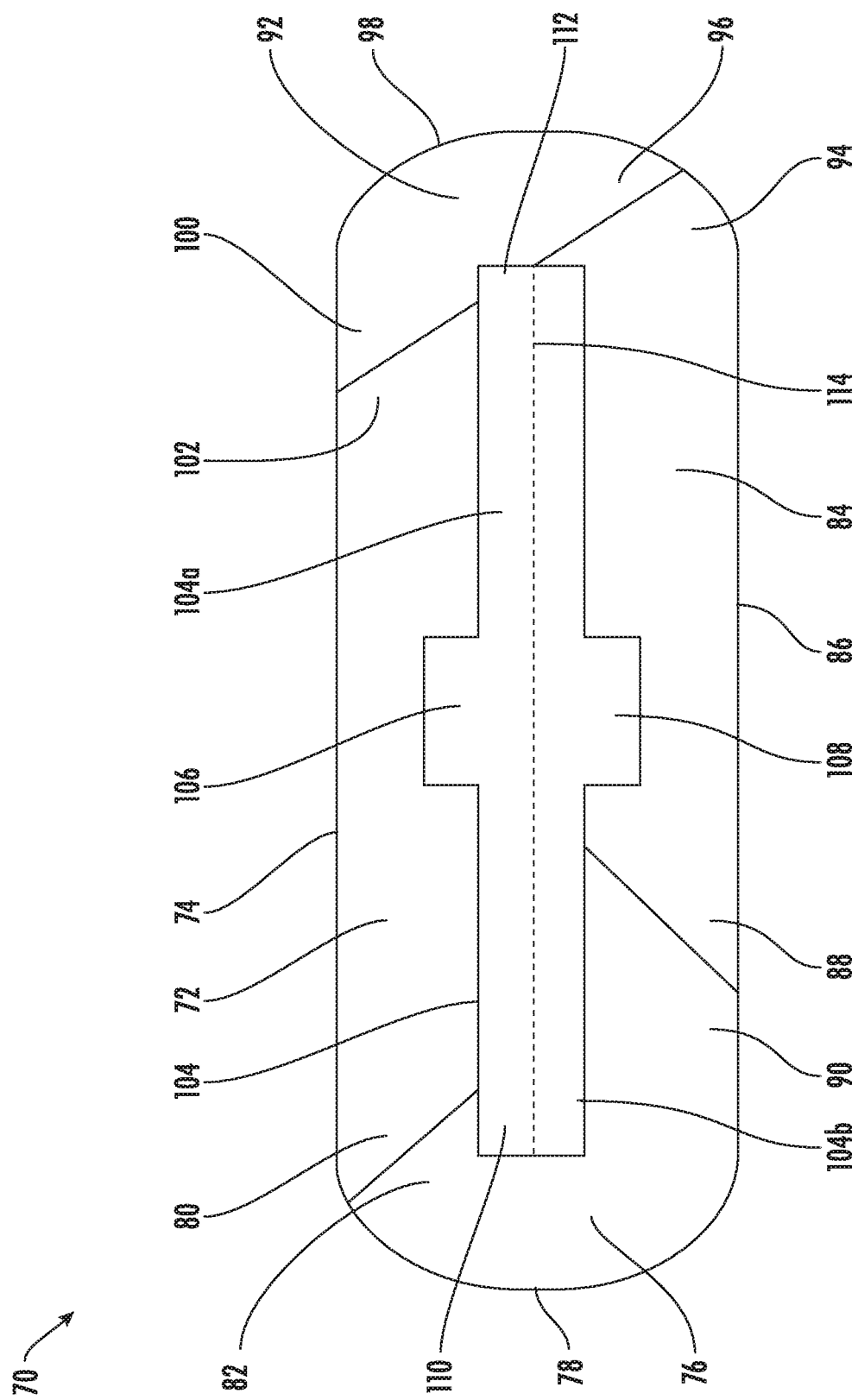
FIG. 4 is a cross-sectional view of a mandrel according to an embodiment of the invention.

The spar 30 is manufactured by layering multiple plies of one or more pre-preg materials around a mandrel having a length at least equal to the spar 30. Referring now to the cross-section of the mandrel 70 illustrated in FIG. 4, the mandrel 70 includes a plurality of components arranged to form a shape with an outer mold line generally complementary to an inner mold line of the spar cavity 34. In the illustrated non-limiting embodiment, the mandrel 70 includes an upper component 72 having an exterior surface 74 shaped to form at least a portion of the interior upper surface 40 of the spar 30. The exterior surface 74 of the upper component 72 may additionally be configured to form a portion of the interior leading surface 36, or alternatively, the interior trailing surface 38. Positioned adjacent the upper component 72 is a leading edge component 76 having an exterior surface 78 configured to form at least a portion of the interior leading edge surface 36 of the spar 30. In addition, the exterior surface 78 of the leading edge component 76 may be shaped to define a portion of the interior lower surface 42 of the spar 30, as illustrated in the FIG., or the interior upper surface 40 of the spar 30. A first side 80 of the upper component 72 is configured to align with an adjacent side 82 of the leading edge component 76 over the length of the spar 30.

A lower component 84 has an exterior surface 86 shaped to form at least a portion of the lower interior surface 42 of the spar 30, and may additionally define a portion of either the interior trailing edge surface 38, or alternatively, the interior leading edge surface 36. A first side 88 of the lower component 84 contacts and adjacent side 90 of the leading edge component 76 over the length of the spar 30. Similarly, a second side 84 of the lower component 84 contacts an adjacent side 96 of the trailing edge component 92 over the length of the spar 30. The trailing edge component 92 has an exterior surface 98 configured to form at least a portion of the interior trailing edge 38 of the spar 30. The exterior surface 98 of the trailing edge component 92 may additionally define a portion of either the interior upper surface 40 (as shown) or the interior lower surface 42 of the spar 30. The opposite side 100 of the trailing edge component 92 is substantially flush with an adjacent side 102 of the upper component 72 over the length of the spar 30. In one embodiment, the adjacent sides of the upper component 72, leading edge component 76, lower component 84, and trailing edge component 92 are removably coupled using keyway grooves and/or magnets (not shown), although the invention is not particularly limited to a mechanism by which the components are connected to maintain a shape. While shown with a particular number and shape of components, it is understood that the number and shapes of the components is not specifically limited to the shown numbers and shapes.

Arranged generally centrally in a space (not shown) formed between the upper component 72, the leading edge component 76, the lower component 84, and the trailing edge component 92, is a center component 104. In one embodiment, at least a portion of the exterior surface (not shown) of the center component 104 is slightly tapered, the taper being generally less than or equal to about two degrees. In such embodiments, a corresponding surface of one of the upper, lower, leading edge, and trailing edge components 72, 76, 84, 92 has a complementary taper. The center component 104 may be configured such that a portion engages each surrounding component. For example, a first protrusion 106 and a second protrusion 108 extend from opposite planar surfaces of the center component 104 to interlock with a portion of the upper and lower components 72, 84. In addition, the ends 110, 112 of the center component 104 are received by a portion of the leading and trailing edge components 76, 92. The center component 104 is configured to retain the upper, lower, leading edge, and trailing edge components 72, 76, 84, 92 in a desired position.

The configuration of these components 72, 76, 84, 92, 104 and their respective interfaces provide a means to remove the mandrel 70 upon completion of the spar lay-up prior to cure. When the center component 104 is removed from the mandrel assembly 70, such as via an end (not shown) of the mandrel 70, at least one of the upper, lower, leading edge, and trailing edge components 72, 76, 84, 92 is configured to fall generally inward, into the space previously occupied by the center component 104, for removable from the mandrel 70.

Each of the components 72, 76, 84, 92, 104 of the mandrel 70 may be formed as a single piece, or alternatively, may include a plurality of segments permanently or removably coupled to form a component. For example, the center component 104 illustrated in FIG. 4 includes two segments 104a, 104b glued together at an interface 114. In the non-limiting embodiment shown in FIG. 5, the upper component 72 includes three similar and generally complementary segments 72a, 72b, 72c extending over the length of the mandrel 70. Each of the segments 72a, 72b, 72c includes a protrusion 116 and/or a hole (not shown) configured to receive the protrusion 116 extending from an adjacent segment. Alternatively, the segments of each component 72, 76, 84, 92, 104 may be selectively coupled to one another using a plurality of magnets (not shown), or with cables (not shown) embedded within each segment.

In one embodiment, at least one of the upper, lower, leading edge, trailing edge, or center component 72, 76, 84, 92, 104, or alternatively the segments of each component, is formed through an additive manufacturing process, such as three-dimensional printing, selective laser sintering (SLS), and electron beam melting (EBM) for example. In an additive manufacturing process, energy is applied to a generally powdered material, such as a powered ceramic or composite material for example, to form a shape.

Because the mandrel 70 is intended to be removed from the interior of the spar 30 before the spar 30 is cured, the mandrel 70 does not need to be a made of a material able to withstand high temperatures. In one embodiment, at least one of the upper, lower, leading edge, trailing edge, or center component 72, 76, 84, 92, 104, or an individual section thereof is formed from a plastic compound, such as acrylonitrile butadiene styrene (ABS) for example, or another material suitable for use in an additive manufacturing process. The plastic compound is not specifically limited, but needs to be sufficient to withstand the pressures of the spar 30 formation. While a metal material could be used for one or more of the components according to aspects of the invention, the ability to use plastics allows for a less expensive alternative as well as different manufacturing mechanisms such as additive manufacturing.

Because the airfoil changes over the length of the rotor blade 22, the cross-section of the mandrel 70, and therefore the shape and size of each component 72, 76, 84, 92, 104 similarly varies over its length to match the varying shape of the spar 30. Each component 72, 76, 84, 92, 104 of the mandrel 70 is formed from a material having a high heat resistance and the ability to withstand a high mechanical load. In one embodiment, the mandrel 70 is formed from a thermal plastic material, such as polyetherketoneketone for example. One or more of the components 72, 76, 84, 92, 104 may include a one or more cables arranged within the component and extending at least partially over the length of the mandrel 70 to improve the strength of the component and also allow for easier removal of a particular piece.

Figure 6:
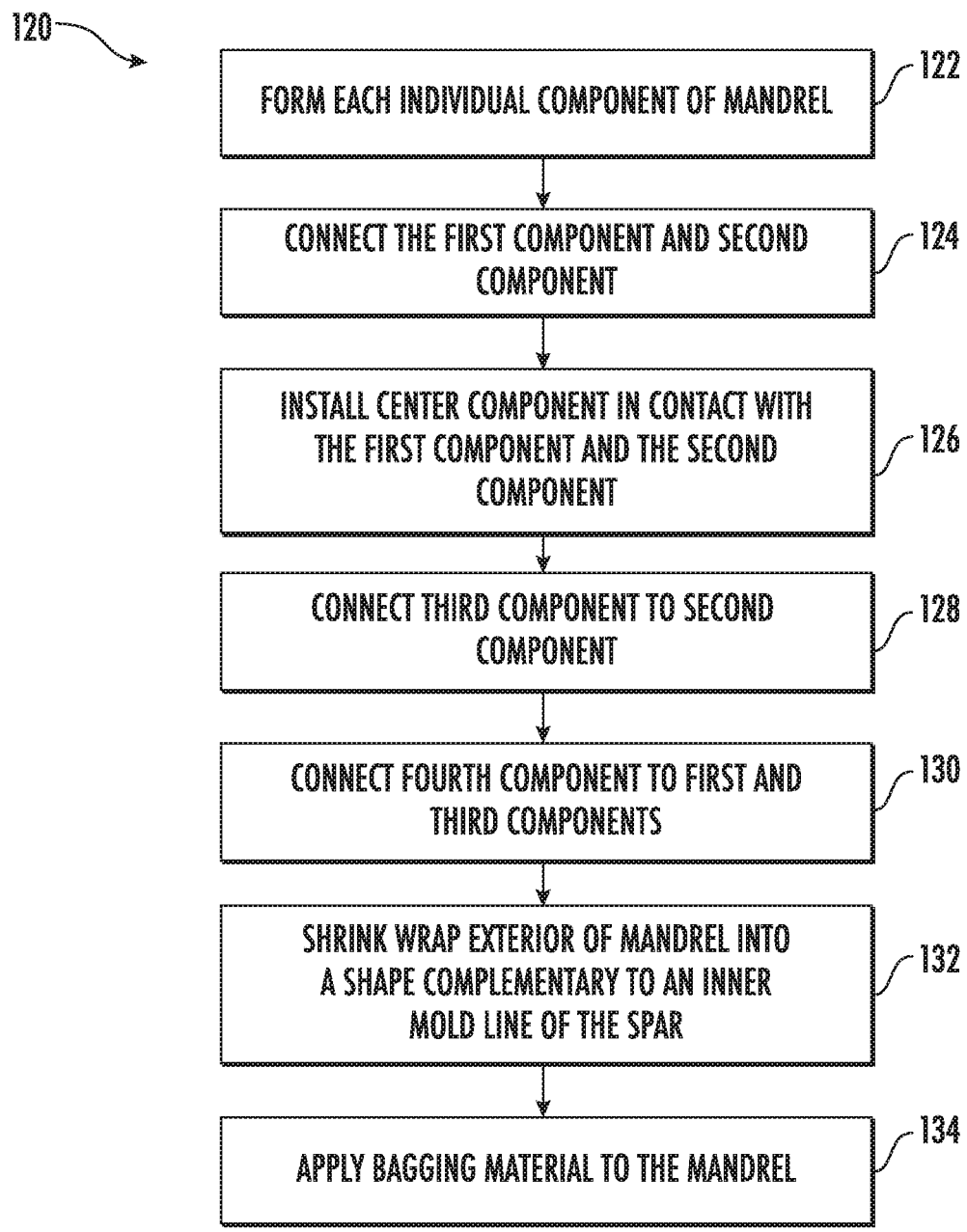
FIG. 6 is a schematic diagram of a method of constructing a mandrel according to an embodiment of the invention.

A method 120 of constructing a mandrel 70 is illustrated in FIG. 6. In block 122, each of the components 72, 76, 84, 92, 104 are formed. In embodiments where one or more of the components include multiple segments, the segments are coupled to one another to form the individual components before the components are assembled into the mandrel 70. In block 124, a first component, such as the lower component 84 for example, is arranged in contact with the center component 104, so that protrusion 108 engages a portion of the lower component 84. In block 126, a second component, such as the leading edge component 76 for example, is positioned adjacent the center component 104 so that end 110 contacts a portion of the leading edge component 76, and the leading edge component 76 and the lower component contact one another along adjacent sides 88, 90. A third component, such as the trailing edge component 92 for example, is positioned adjacent the center component 104 and the lower component 84 in block 128.

Figure 5:
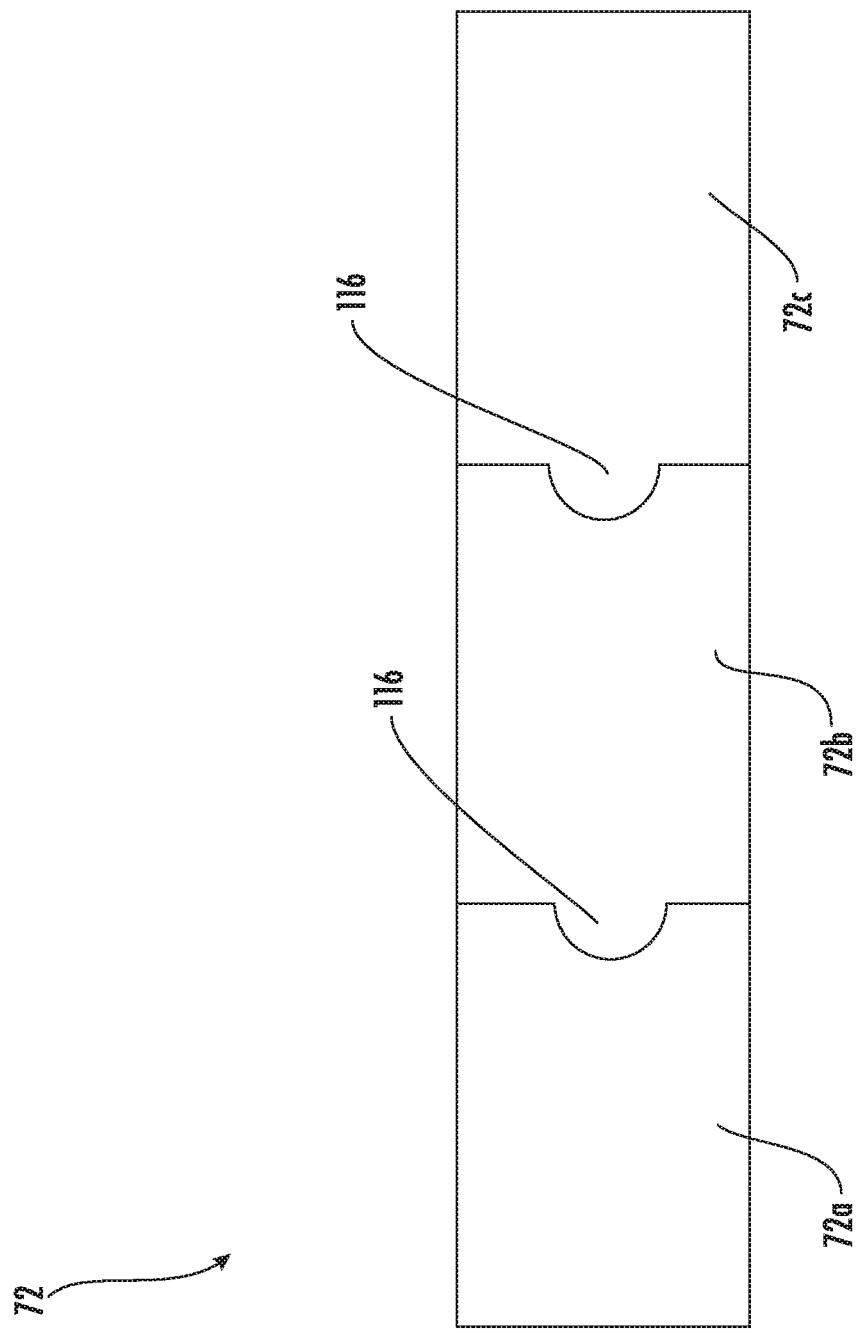
FIG. 5 is a top view of a component of the mandrel according to an embodiment of the invention.

When installed, end 112 of the center component contacts a portion of the trailing edge component 92, and the trailing edge component 92 and the lower component contact one another along adjacent sides 94, 96. The fourth component, such as the upper component 72 for example, is positioned adjacent the center component 104 so that the protrusion 106 of the center component 104 is received within a portion of the upper component 72 and so that sides 80 and 102 abut adjacent sides 82 and 100 of the leading edge component 76 and the trailing edge component 92, respectively, as shown in block 130. Where the mandrel 70 has multiple segments as shown in FIG. 5, blocks 124 through 130 are repeated for each segment and the constructed segments are linked. Where only a single segment is used for the mandrel 70, there is no need for a linking operation. Further, while shown with each segment having components of the same length along the spar 30, it is understood that one or more of the segments could be longer. By way of example, the center component 104 could be a single piece extending the length of the mandrel 70, with the remaining components 72, 76, 92 being shorter in length such that multiple components (72a, 72b, 72c) would be used.

In block 132, the mandrel 70 is then shrink wrapped to configure the exterior of the mandrel 70 into a shape complementary to the inner mold line of the spar 30. The shrink wrap (such as a plastic wrap) is also configured to hold the mandrel together while lay-up of the composite spar 30 occurs. A bagging material (not shown) suitable for use in high temperature applications may be applied to the mandrel 70 in block 134. The bagging material is configured to apply a pressure to the inside of the spar 30 while the spar 30 is being cured.

Figure 7:
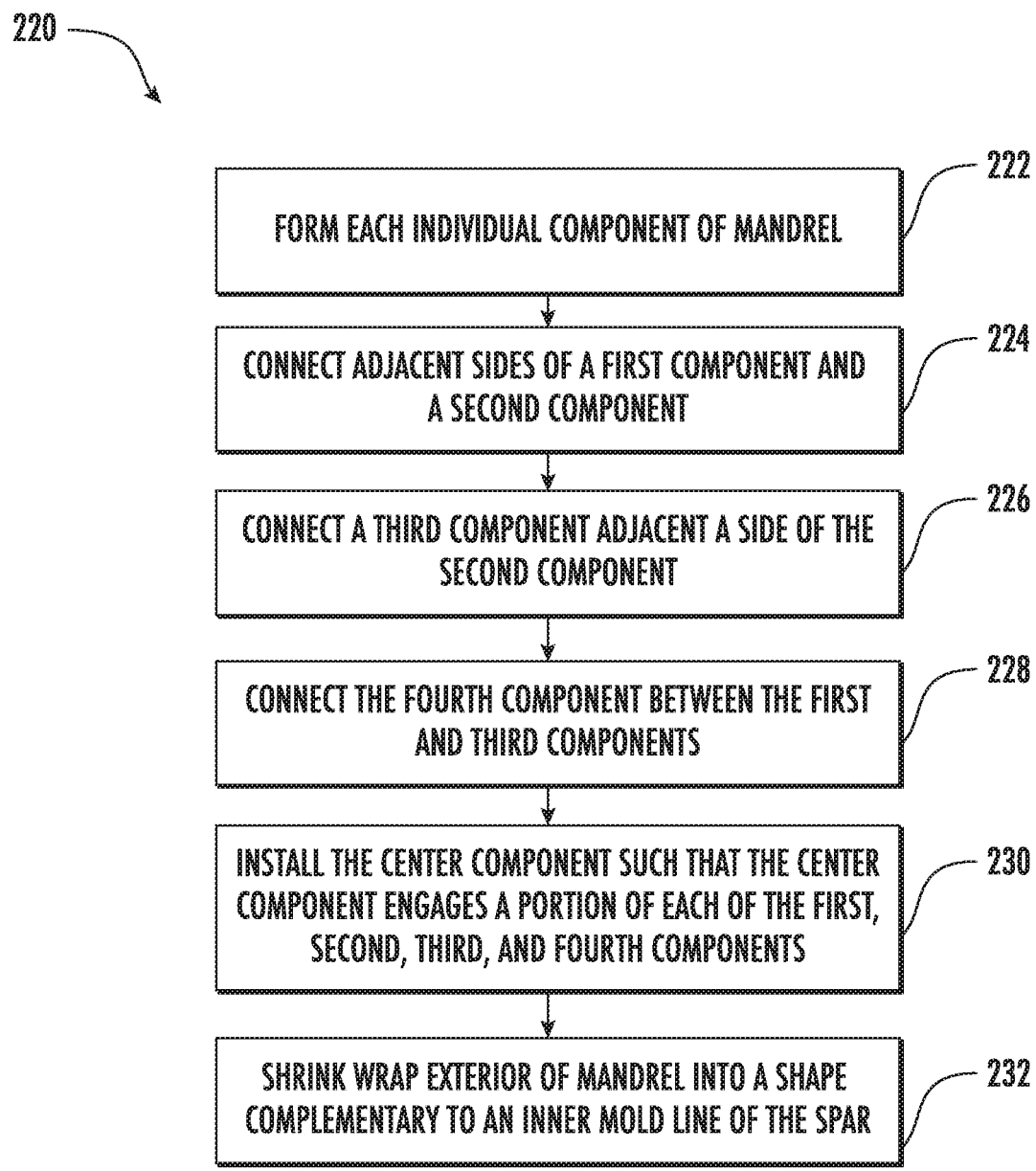
FIG. 7 is a schematic diagram of a method of constructing a mandrel according to another embodiment of the invention.

Another method 220 of constructing a mandrel 70 is illustrated in FIG. 7. In block 222, each of the components 72, 76, 84, 92, 104 are formed. In embodiments where one or more of the components include multiple segments, the segments are coupled to one another to form the individual components before the components are assembled into the mandrel 70. In block 224, a first and second component, such as the lower component 84 and the leading edge component 76 for example, are positioned next to one another such that the adjacent sides 88, 90 of the components are aligned. In block 226, a third component, such as the trailing edge component 92 for example, is installed adjacent side 94 of the lower component 84. In block 228, a fourth component, such as the upper component 72 for example, is installed between the leading and trailing edge components 76, 92, opposite the lower component 84. The center component 104 is installed in the space formed between the first, second, third, and fourth components, as shown in block 230. The center component 104 engages at least a portion of each of the first, second, third, and fourth components. In block 232, the mandrel 70 is then shrink wrapped to configure the exterior of the mandrel into a shape complementary to the inner mold line of the spar 30.

Figure 8:
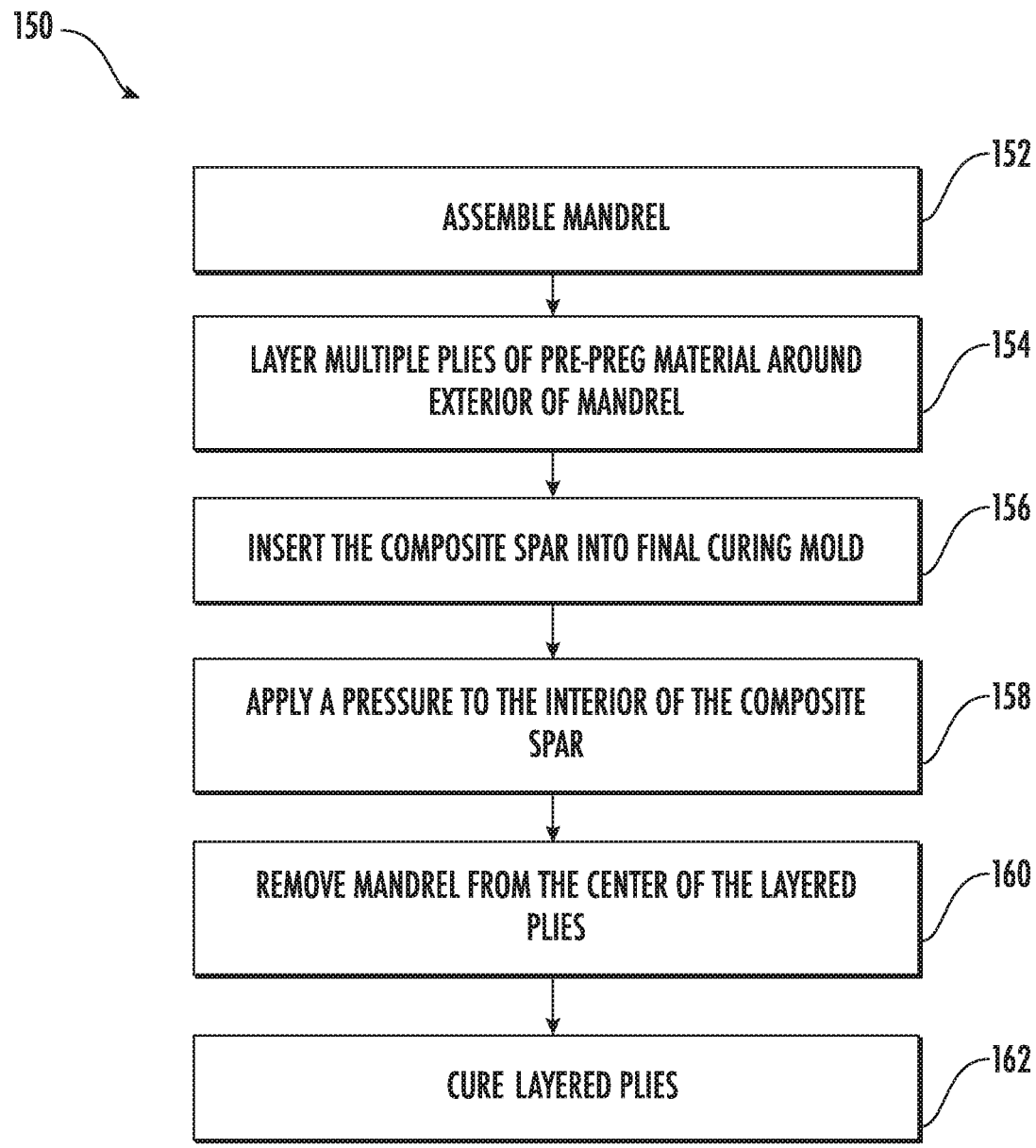
FIG. 8 is a schematic diagram of a method of constructing a spar according to an embodiment of the invention.

Referring now to FIG. 8, a method of constructing a spar 30 is illustrated. After the mandrel 70 has been assembled, as shown in block 152, multiple plies of pre-preg material having various fiber orientations are layered around one or more of the exterior surfaces 74, 78, 86, 98 of the mandrel 70, as shown in block 154. In block 156, once lay-up of the layers of composite material has been completed, the spar 30 is inserted in a final curing mold (not shown). The final curing mold represents the exterior of the composite spar 30. The bagging material arranged about the mandrel 70 is then pressurized in block 158 to apply a pressure to the inside of the laid-up composite spar 30. In block 160, the mandrel is removed from the spar cavity 34. To remove the mandrel 70, first the center component 104 of the mandrel 70 is detached from the other components 72, 76, 84, 92 and slide out of the mandrel 70. Then the remaining components are removed sequentially until the entire mandrel 70 has been removed from the spar cavity 34, such as by sliding the components 72, 76, 84, 92 out individually and/or allowing the components 72, 76, 84, 92 to collapse into the void created by the removed center component 104 and removing the collapsed components 72, 76, 84, 92. The layered composite plies are then cured, such as with a vacuum for example, to form a spar 30 in block 162.

By using a segmented hard mandrel 70 to form the spar 30 of a rotor blade assembly 22, the mandrel 70 is easily removable, even in instances when the spar 30 includes reverse twist. Because the components of the mandrel 70 are formed via an additive manufacturing process, the mandrel 70 is significantly less expensive the conventional composite or metal mandrels in part because no ancillary tooling is required in its formation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of constructing a mandrel including a plurality of components, the mandrel being substantially complementary to a spar cavity of a spar, comprising:
   connecting a first component and a second component to form a central space there between; and
   inserting a center component within the central space such that the center component retains the first component and second component in a desired position forming an outer surface of the mandrel which corresponds to an inner surface of the spar cavity,
   the first component having an exterior surface configured to form an interior leading edge of the spar or an interior trailing edge of the spar, and the second component having an exterior surface configured to form a portion of a lower interior surface of the spar or a portion of an upper interior surface of the spar, and the center component comprising a first end and a first protrusion, the first end and the first protrusion respectively configured to be received by the first component and the second component.

2. The method according to claim 1, wherein connecting the first component and second component comprises magnetically coupling the first and second components.

3. The method according to claim 1, wherein connecting the first component and second component comprises interlocking the first and second components using complementary keyway grooves.

4. The method according to claim 1, wherein inserting the center component further comprises interlocking a portion of the center component with the first and second components.

5. The method according to claim 1, wherein connecting the first and second components and inserting the component forms a first segment of the mandrel, the method further comprising:
   forming a second segment by connecting a third component and a fourth component to form another central space there between;
   inserting another center component within the another central space such that the another center component retains the third component and fourth component in a desired position forming another outer surface of the mandrel which corresponds to another inner surface of the spar cavity; and
   connecting the formed first segment and second segment of the mandrel.

6. The method according to claim 1, further comprising forming at least one of the first component, second component, and center component using a plastic material via an additive manufacturing method.

7. The method according to claim 1, further comprising applying a layer of shrink wrap about the outer surface of the mandrel.

8. The method according to claim 7, further comprising applying a bagging material about the shrink wrap, the bagging material being configured to apply a pressure to the inner surface of the spar cavity.

9. The method according to claim 1, further comprising:
constructing a spar about the mandrel, wherein constructing the spar further comprises:
- layering multiple plies of material about at least a portion of an exterior of the mandrel;
- installing the mandrel in a final curing mold;
- applying a pressure to at least one of an interior first surface or an interior second surface of the spar;
- removing the mandrel from a center of the layered plies by individually removing the first, second, and center components; and
- curing the layered plies.

10. The method according to claim 9, wherein removing the mandrel includes the sequential steps of:
- removing the center component of the mandrel; and
- removing each of the first component and second component individually.

11. The method according to claim 9, wherein the layered plies have varying fiber orientations relative to the mandrel.

12. The method according to claim 9, wherein the layered plies are cured using a vacuum.

13. The method of claim 1, wherein at least one of the first component, second component, or center component varies in shape along a length of the spar.

14. The method of claim 1, further comprising connecting a third component and a fourth component adjacent the first and second components,
the third component having an exterior surface configured to form a portion of the interior leading edge of the spar or a portion of the interior trailing edge of the spar, and the fourth component having an exterior surface configured to form a second portion of the lower interior surface of the spar or a second portion of the upper interior surface of the spar, and the center component further comprising a second end and a second protrusion, the second end and the second protrusion respectively configured to be received by the third component and the fourth component.

15. The method of claim 1, wherein at least one of the first component, second component, or center component further comprises a plurality of segments disposed over a length of the spar.

* * * * *